US011301891B2

(12) United States Patent
DeAngelo et al.

(10) Patent No.: US 11,301,891 B2
(45) Date of Patent: *Apr. 12, 2022

(54) SYSTEMS AND METHODS FOR LINKING ACH DATA WITH MERCHANT LOYALTY DATA

(71) Applicant: Worldpay, LLC, Symmes Township, OH (US)

(72) Inventors: Scott Wayne DeAngelo, Mason, OH (US); Dennis A. Kettler, Lebanon, OH (US); Sayid Shabeer, Ashland, MA (US)

(73) Assignee: Worldpay, LLC, Symmes Township, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/238,502

(22) Filed: Apr. 23, 2021

(65) Prior Publication Data

US 2021/0241306 A1 Aug. 5, 2021

Related U.S. Application Data

(63) Continuation of application No. 15/359,141, filed on Nov. 22, 2016, now Pat. No. 11,017,421.

(51) Int. Cl.
*G06Q 30/02* (2012.01)
*G06Q 20/02* (2012.01)
(Continued)

(52) U.S. Cl.
CPC ....... *G06Q 30/0222* (2013.01); *G06Q 20/023* (2013.01); *G06Q 20/202* (2013.01);
(Continued)

(58) Field of Classification Search
CPC ............ G06Q 30/0222; G06Q 20/023; G06Q 20/202; G06Q 20/387; G06Q 20/40145; G06Q 20/405; G06Q 30/0233
See application file for complete search history.

(56) References Cited

U.S. PATENT DOCUMENTS 9,576,428 B2 2/2017 Argue et al.
10,475,005 B1 * 11/2019 Ulrich ................ G06Q 20/3278
(Continued)

OTHER PUBLICATIONS

Carton, F., Hedman, J., Dennehy, D., Damsgaard, J., Tan, K.-T. and McCarthy, J.B. (2012) 'Developing a framework for mobile payments integration', Electronic Journal of Information Systems Evaluation, 15(1), pp. 14-25. (Year: 2012).*

(Continued)

*Primary Examiner* — Michael W Schmucker
*Assistant Examiner* — Christopher C Busch
(74) *Attorney, Agent, or Firm* — Bookoff McAndrews, PLLC

(57) ABSTRACT

A method for linking alternative payment information with customer loyalty data includes obtaining a customer loyalty identifier associated with a customer, reading customer data from a database based on the obtained customer loyalty identifier, obtaining alternative payment information from the read customer data, determining whether payment by the alternative payment information is enabled for the customer loyalty identifier, prompting the customer to enable payment by the alternative payment information, prompting the customer for authorization information associated with payment by the alternative payment information, enabling payment by the alternative payment information for the customer loyalty identifier, and applying the alternative payment information to a current purchase of the customer.

20 Claims, 4 Drawing Sheets

(51) Int. Cl.
*G06Q 20/38* (2012.01)
*G06Q 20/20* (2012.01)
*G06Q 20/40* (2012.01)

(52) U.S. Cl.
CPC ......... *G06Q 20/387* (2013.01); *G06Q 20/405* (2013.01); *G06Q 20/40145* (2013.01); *G06Q 30/0233* (2013.01)

(56) References Cited

U.S. PATENT DOCUMENTS

| | | |
|---|---|---|
| 2007/0022008 A1 | 1/2007 | Kingsborough et al. |
| 2011/0191160 A1* | 8/2011 | Blackhurst ............. G06Q 20/20 705/14.38 |
| 2012/0316976 A1 | 12/2012 | Dykes |
| 2014/0279524 A1 | 9/2014 | Slusser et al. |
| 2018/0260833 A1 | 9/2018 | Khan et al. |

OTHER PUBLICATIONS

Carlton, F. et al Developing a framework for mobile payments integration, Electronic Journal of Information Systems Evaluation, 15(1), pp. 14-25. (2012).

\* cited by examiner

| CUSTOMER LOYALTY IDENTIFIER | ACH DATA | | EMAIL ADDRESS |
|---|---|---|---|
| | ROUTING NO | ACCT. NO. | |
| A3TN98... | 123456789 | 12345 | DENNIS@VANTIV.COM |
| Z4XY54... | 456789123 | 56789 | SCOTT@VANTIV.COM |
| BICA32 | 135792468 | 57924 | CHRIS@VANTIV.COM |
| | ... | ... | |

SYSTEMS AND METHODS FOR LINKING ACH DATA WITH MERCHANT LOYALTY DATA

CROSS-REFERENCE TO RELATED APPLICATION(S)

This patent application is a continuation of and claims the benefit of priority to U.S. application Ser. No. 15/359,141, filed on Nov. 22, 2016, the entirety of which is incorporated herein by reference.

TECHNICAL FIELD

The present disclosure relates generally to the field of customer payment transactions and, more particularly, to linking alternative payment information with customer loyalty data.

BACKGROUND

Traditionally, merchants and other store owners have point of sale (POS) terminals and POS systems that can accept check or payment card payments from customers for goods and services. Merchants typically contract with an acquirer processor to process payment transactions originating from the merchant's POS terminals and POS systems. Acquirer processors process the payment transactions and settle funds between customers' and merchants' accounts. Online vendors accept bank and payment card payments from Internet customers and can process those payments using services provided by payment network providers, such as acquirer processors. Utilities, service providers, and other online parties similarly accept bank transfers and accept payments from payment cards using similar services provided by payment network providers.

Payment network providers, such as acquirer processors, typically charge the merchant fees for processing such payment card transactions. A large portion of these fees may be pass-through fees from the card issuing banks, also known as interchange fees, and the card networks, also known as assessment fees. In contrast, such fees are typically much lower for processing check payments, also known as automated clearing house (ACH) payments.

Customers may prefer the convenience of payment by payment card over check payments, and may be unaware of or otherwise indifferent to the cost of payment card processing fees because the fees are not directly reflected in the cost of the items being purchased, while merchants may prefer to accept ACH payments in order to reduce payment processing fees. In order to persuade a customer to make a payment by ACH instead of a payment card, a merchant may be willing to offer discounts or other incentives. However, in a traditional payment processing system, a merchant may not have the ability to recognize a customer, associate the transaction with the customer's ACH payment information, and offer such incentives. The merchant may have data associating the customer's ACH data with other information associated with the customer such as, for example, customer loyalty account information or previously stored personally identifying information (PII), such as payment card information, etc.

Accordingly, there is a need for systems and methods for associating a customer transaction with previously stored ACH payment information and offering the customer incentives to process the transaction by ACH instead of a payment card.

SUMMARY

According to certain aspects of the present disclosure, systems and methods are disclosed for linking alternative payment information with customer loyalty data.

In one embodiment, a computer-implemented method is disclosed for linking alternative payment information with customer loyalty data. The method includes: obtaining a customer loyalty identifier associated with a customer, reading customer data from a database based on the obtained customer loyalty identifier, obtaining alternative payment information from the read customer data, and applying the alternative payment information to a current purchase of the customer.

In accordance with another embodiment, a system is disclosed for linking alternative payment information with customer loyalty data. The system comprises: a memory having processor-readable instructions stored therein; and a processor configured to access the memory and execute the processor-readable instructions, which when executed by the processor configures the processor to perform a plurality of functions, including functions to: obtain a customer loyalty identifier associated with a customer, read customer data from a database based on the obtained customer loyalty identifier, obtain alternative payment information from the read customer data, and apply the alternative payment information to a current purchase of the customer.

In accordance with another embodiment, a non-transitory machine-readable medium is disclosed that stores instructions that, when executed by a computer, cause the computer to perform a method for linking alternative payment information with customer loyalty data. The method includes: obtaining a customer loyalty identifier associated with a customer, reading customer data from a database based on the obtained customer loyalty identifier, obtaining alternative payment information from the read customer data, and applying the alternative payment information to a current purchase of the customer.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the detailed embodiments, as claimed.

It may be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate exemplary embodiments of the present disclosure and together with the description, serve to explain the principles of the disclosure.

FIG. 3 depicts contents of a merchant payment transaction database, according to one or more embodiments.

DETAILED DESCRIPTION

Figure 1:
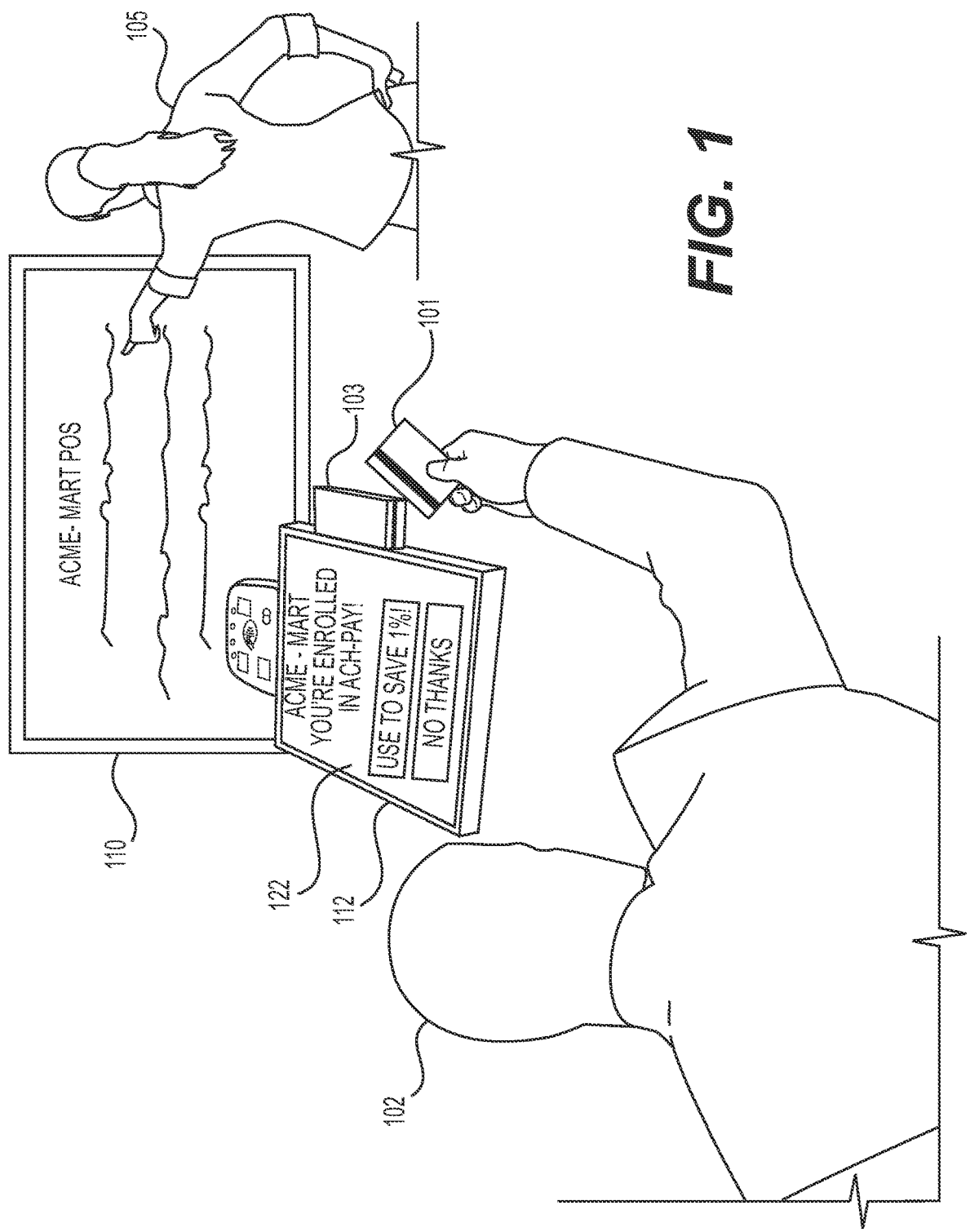
FIG. 1 depicts a payment transaction between a customer and a merchant.

While principles of the present disclosure are described herein with reference to illustrative embodiments for particular applications, it should be understood that the disclosure is not limited thereto. Those having ordinary skill in the art and access to the teachings provided herein will recognize additional modifications, applications, embodiments, and substitution of equivalents all fall within the scope of the embodiments described herein. Accordingly, the invention is not to be considered as limited by the foregoing description.

Various non-limiting embodiments of the present disclosure will now be described to provide an overall understanding of the principles of the structure, function, and use of systems and methods disclosed herein for installing and managing point of interaction devices within a merchant environment.

As described above, merchants may prefer to accept ACH payments in order to reduce payment processing fees, and, in order to persuade a customer to make a payment by ACH instead of a payment card, a merchant may be willing to offer discounts or other incentives. Thus, the embodiments of the present disclosure are directed to providing systems and methods for linking customer ACH data with merchant loyalty data.

For simplicity, the description that follows will be provided by reference to a "payment vehicle" or a "payment card," which generally refers to any type of alternative to currency. As is to be clear to those skilled in the art, no aspect of the present disclosure is specifically limited to a specific type of payment vehicle or payment card. Therefore, it is intended that the following description encompasses the use of the present disclosure with many other forms of financial alternatives to currency, including credit cards, debit cards, smart cards, single-use cards, prepaid cards, electronic currency (such as might be provided through a cellular telephone or personal digital assistant), and the like. Payment vehicles or payment cards can be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, prepaid or stored-value cards, electronic benefit transfer cards, or any other like financial transaction instrument.

Merchants use payment platforms, such as Point of Sale ("POS") terminals, POS systems, and pin pad terminals, to accept payments from customers in the form of cash, check, credit cards, and so forth. Although POS terminals and POS systems are the most common type of payment platforms, the term "payment platform" as used herein is intended to be construed broadly and would include systems for coupon redemption, and systems for implementing frequent use programs or customer loyalty programs, among other suitable transaction-based systems that involve certification of their ability to correctly process transactions with other systems. Nonlimiting examples of transaction-based systems could also include payment facilitators, ecommerce systems, mobile platforms, non-terminal POS solutions, and software solutions, such as those developed by independent software vendors, among other suitable transaction-based systems.

One or more examples of these non-limiting embodiments are illustrated in the selected examples disclosed and described in detail with reference to FIGS. 1-4 in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

Turning to FIG. 1, in a typical scenario, a customer 102 may complete a purchase using a merchant's point of sale (POS) device 110 and pin pad terminal 112. During the purchase transaction, customer 102 may present an identifier 101 for a merchant loyalty program or, alternatively, a payment vehicle, such as payment vehicle 201 depicted in FIG. 2. Merchant loyalty program identifier 101 may be read by, for example, a card reader 103, but other means for reading merchant loyalty program identifier 101 may be employed. Pin pad terminal 112 may include a display area 122, which may be used to display, for example, details of the customer's purchase, prompts for user interaction, promotional messages for the merchant or for other entities, etc. In FIG. 1, display area 122 is depicted as displaying a prompt to customer 102 offering a discount in exchange for participation in an alternative payment program. An exemplary merchant environment that may include pin pad terminal 112 and display area 122 will be described in greater detail with respect to FIG. 2.

Figure 2:
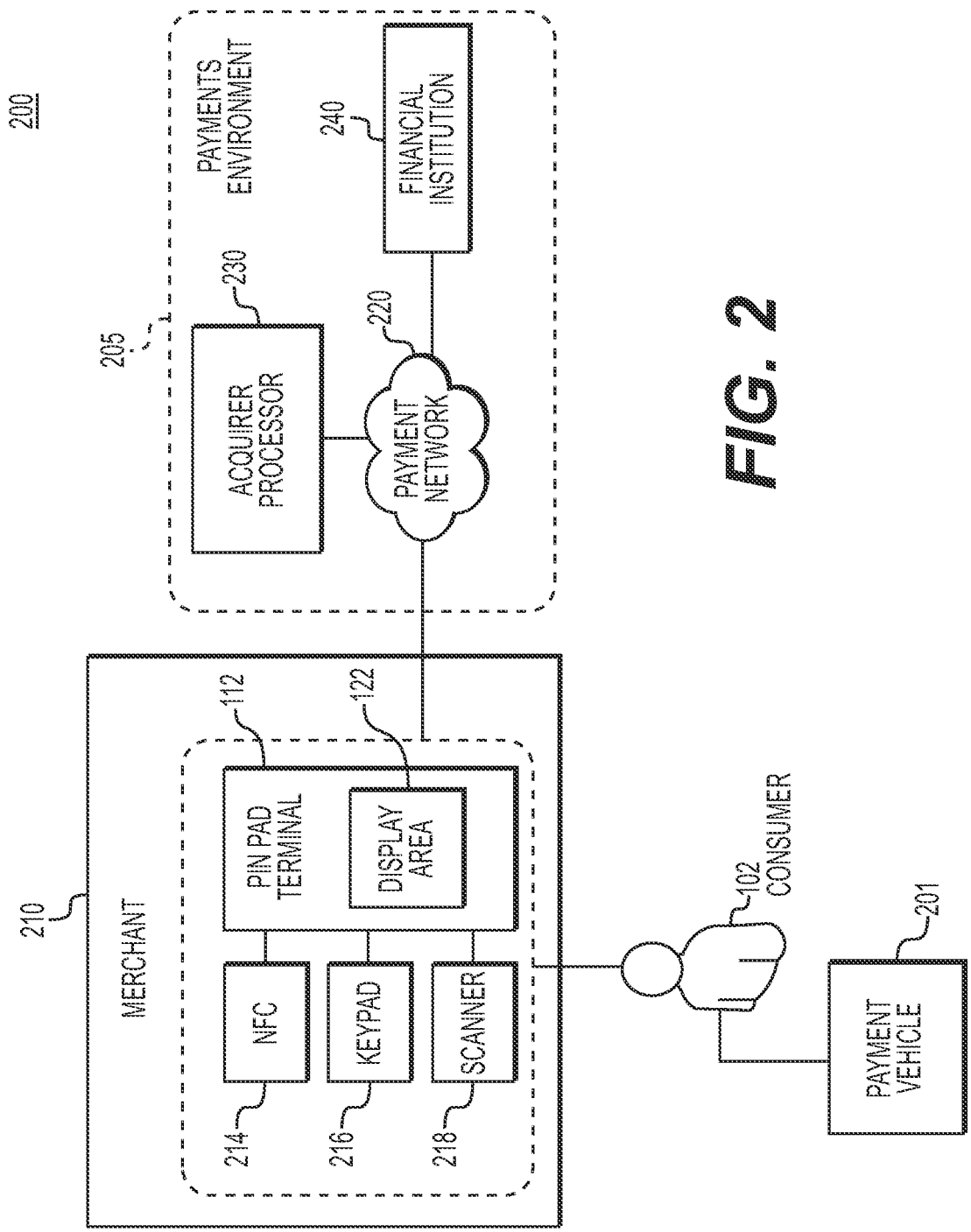
FIG. 2 depicts a merchant environment for processing customer payment transactions, according to one or more embodiments.

FIG. 2 depicts a merchant environment 200 for processing customer payment transactions, according to one or more embodiments. Environment 200 may include merchant 210, an acquirer processor 230, a financial institution 240, and customer 102, which may be provided in communication with each other via a payment network 220. The components of the payments processing network may be connected by any combination of wired or wireless networks, for example, PSTNs and/or the Internet. Acquirer processor 230 (e.g., acquiring bank) may be in partnership with payment network 220, such that the acquirer processor 230 may process payments through, and on behalf of, payment network 220. Payment network 220 may in turn have a partnership with financial institution 240 (e.g., issuing bank). Financial institution 240 may hold accounts for one or more customers 102. Customer 102 may have a payment vehicle 201 (e.g., credit card, debit card, stored value card, etc.) which may be affiliated with payment network 220. Customer 102 may be able to use their payment vehicle 201 to make purchases with merchant 210.

Acquirer processor 230 may be an entity that provides a variety of electronic payment processing services to merchant 210. For example, acquirer processor 230 may be an entity that receives payment information from a transaction which occurs at a pin pad terminal 112 of merchant 210. The payment information may be, for example, payment card information encoded in the magnetic stripe or EMV chip of payment vehicle 201 and a payment amount of a transaction being made by, for example, customer 102 with merchant 210 using the payment card account associated with payment vehicle 201. Acquirer processor 230 may process the information, and may send the information to the customer's respective financial institution 240 via an appropriate payment network 220 depending on the particulars of payment vehicle 201. Processing the information may include, for example, determining the identity of payment network 220 and financial institution 240 associated with the particular payment vehicle 201.

Acquirer processor 230 may also receive information from payment network 220, such as confirmation or rejection of an attempted transaction using payment vehicle 201, and may convey that information to the appropriate POS terminal. Moreover, acquirer processor 230 may provide security and/or encryption services to merchant 210 and payment network 220, such that payments processed at pin pad terminal 112 may be completed with a decreased risk of data or financial theft or loss. Acquirer processor 230 may be located, for example, at a remote location from merchant 210 that uses its services, and may, for example, interact with merchant 210 primarily over an electronic network, such as a data network or the Internet.

Payment network 220 may be, for example, a network that relays debit and/or credit transactions to and from various accounts at financial institution 240. For example, payment network 220 may have a partnership program with financial institution 240 through which financial institution 240 may provide a payment vehicle account to customer 102 associated with payment network 220. Payment network 220 may also be partnered with acquirer processor 230, which may manage payment transactions associated with payment network 220. Examples of payment network brands include, e.g., Visa, MasterCard, Discover, and American Express. While a single payment network 220 is illustrated, it is to be appreciated that multiple payment networks may be partnered with a single or multiple acquirer processors.

Financial institution 240 may be a bank that manages payment accounts associated with one or more payment networks 220 on behalf of one or more customers 102. For example, financial institution 240 may allow for customer 102 to build up a revolving credit balance at financial institution 240 and may periodically receive payments from customer 102 to pay down the balance. Customer 102 may be an individual, a company, or other entity having accounts with one or more financial institutions 240. Each customer 102 may generally have at least one payment vehicle 201 associated with each payment account held by that customer. Each customer 102 may have multiple accounts with multiple financial institutions 240, which may be affiliated with the same or different payment networks 220.

Merchant 210 may be a merchant offering goods and/or services for sale to customer 102 who have contracted with acquirer processor 230. Merchant 210 may be equipped with POS device 110, which is configured to receive payment information from payment vehicle 201 and to relay received payment information to acquirer processor 230. Merchant 210 can be any type of merchant, such as a brick-and-mortar retail location or an e-commerce/web-based merchant with a POS device 110 or a web payment interface.

In FIG. 2, customer 102 is shown to be associated with a payment vehicle 201. As is to be appreciated, payment vehicle 201 can include any type of payment vehicle that can be utilized to initiate a payment transaction. Unless otherwise specified herein, "payment vehicle" includes a virtual card, such as a display or screenshot for a mobile phone or for another portable device (e.g., a flash drive, smart chip, a laptop or portable computer), or for a computer device (e.g., a desktop computer) in combination with data indicative of an account number or other account indicative information. Data associated with the cards may include an encrypted or unencrypted account number or other encrypted or unencrypted account indicative information and/or encrypted or unencrypted information associated with a particular card, issuer, creator or group of merchants. It is also contemplated that the card may have multiple embodiments or forms. For example, the card may be a physical card (e.g., in the form of a magnetic striped plastic card), a virtual card (e.g., in the form of a display on a smart phone), or both. In embodiments in which the card is a virtual card, the corresponding account information (e.g., account number) would initially be provided to the customer and the customer would communicate the account information to the merchant. The virtual card may be communicated by displaying a display or screenshot, and/or by transmitting a signal, such as by using a near field communication (NFC) technology, or other secure transport technologies to complete the transaction with the selected merchant. NFC is a short range, high frequency, wireless communication technology that enables the exchange of data between devices over a relatively short distance. Optionally, the virtual card may have a display element (e.g., a barcode or string of numbers) which identifies the account number associated with the card. Alternatively, the virtual card may have display elements relating to the merchants which accept the card. Thus, whether the card is physical or virtual, the card may communicate account information.

A POS device 110 of merchant 210 may provide transaction information to the payment network 220 using any desired payment transaction communications, and may communicate with a pin pad terminal 112. When customer 102 checks-out, or pays for the goods or services, the identifying indicia of customer 102 may be used for authentication. In one or more embodiments, pin pad terminal 112 may include an NFC system 214. NFC system 214 may communicate wirelessly with payment vehicle 201 of customer 102, for example to obtain an authorization code or identifying information of customer 102 or of payment vehicle 201. In one or more embodiments, pin pad terminal 112 may include a keypad 216. Customer 102 may enter a personal identification number on keypad 216 for making a payment. Other numbers or alphanumeric characters, such as temporary passwords or authorization codes, are also contemplated as would be understood by one of ordinary skill in the art. In one or more embodiments, pin pad terminal 112 may include a scanner 218. Customer 102 may display a code, such as, for example, a barcode or quick response (QR) code, etc., on the display of their mobile computing device to provide identifying indicia of customer 102. Scanner 218 may be, for example, a handheld scanner, an embedded scanner such as is used to scan items at grocery stores, a camera, and so forth as would be understood by one of ordinary skill in the art.

Pin pad terminal 112 may include a display area 122. In one or more embodiments the display area 122 may be, for example, a window, a widget, or a pop-up, a webpage, and so forth, and be rectangular or nonrectangular, and occupy one or multiple contiguous or non-contiguous areas of pin pad terminal 112.

Pin pad terminal 112 may generate a payment request for payment by merchant 210. The payment request may include information such as, for example, information identifying the merchant to acquirer processor 230 or the party of payment network 220, the payment amount, which can include a gratuity, identifying indicia for customer 102, authentication information such as whether the customer was authenticated by merchant 210 using images of customer 102, and/or authentication information such as personal identification number entered on keypad 216 by the customer, a code scanned by scanner 218, or information about customer 102 or payment vehicle 201 received via NFC handshake or any other suitable authentication information.

In such a payment processing environment, any of acquirer processor 230, financial institution 240, or the issuer of payment vehicle 201 may charge fees to merchant 210 in exchange for completing the transaction. Merchant 210 may, accordingly, wish to use alternative payment mechanisms in order to avoid or reduce such fees. For example, merchant 210 may wish to direct customer 102 to make payment using a check payment, also known as an automated clearing house (ACH) payment, which may reduce or eliminate fees paid by merchant 210. Methods and systems for such alternative payments will be disclosed below with respect to FIGS. 3 and 4.

In the course of completing a payment transaction, merchant 210 may collect certain information pertaining to customer 102. For example, merchant 210 may collect ACH data 320, including a routing number 322 and account number 324, an email address 330, and a customer loyalty identifier 310 associated with payment vehicle 201 of customer 102. This information may be stored in a payment transaction database 300 as shown in FIG. 3. For example, customer loyalty identifier 310 and ACH data 320 may be obtained by merchant 210 in the course of processing separate payment transactions for customer 102. Alternatively, for example, merchant 210 may obtain customer loyalty identifier 310 and/or ACH data 320 through customer interactions not associated with a transaction such as, for example, during an enrollment process for the merchant customer loyalty program, customer surveys that may be conducted online, by telephone or in person, direct entry by the customer in order to authorize the association of customer loyalty identifier 310 and/or ACH data 320 with other items of data pertaining to the customer, etc. Merchant 210 may then associate customer loyalty identifier 310 with ACH data 320 based on other common data pertaining to customer 102 such as, for example, email address 330 as shown in FIG. 3. For example, merchant 210 may obtain a customer's email address at the time of issuing a customer loyalty identifier so that merchant 210 may record email address 330 in payment transaction database 300. Other types of common data may be used such as, for example, telephone numbers, postal addresses, payment account numbers, etc.

Figure 4:
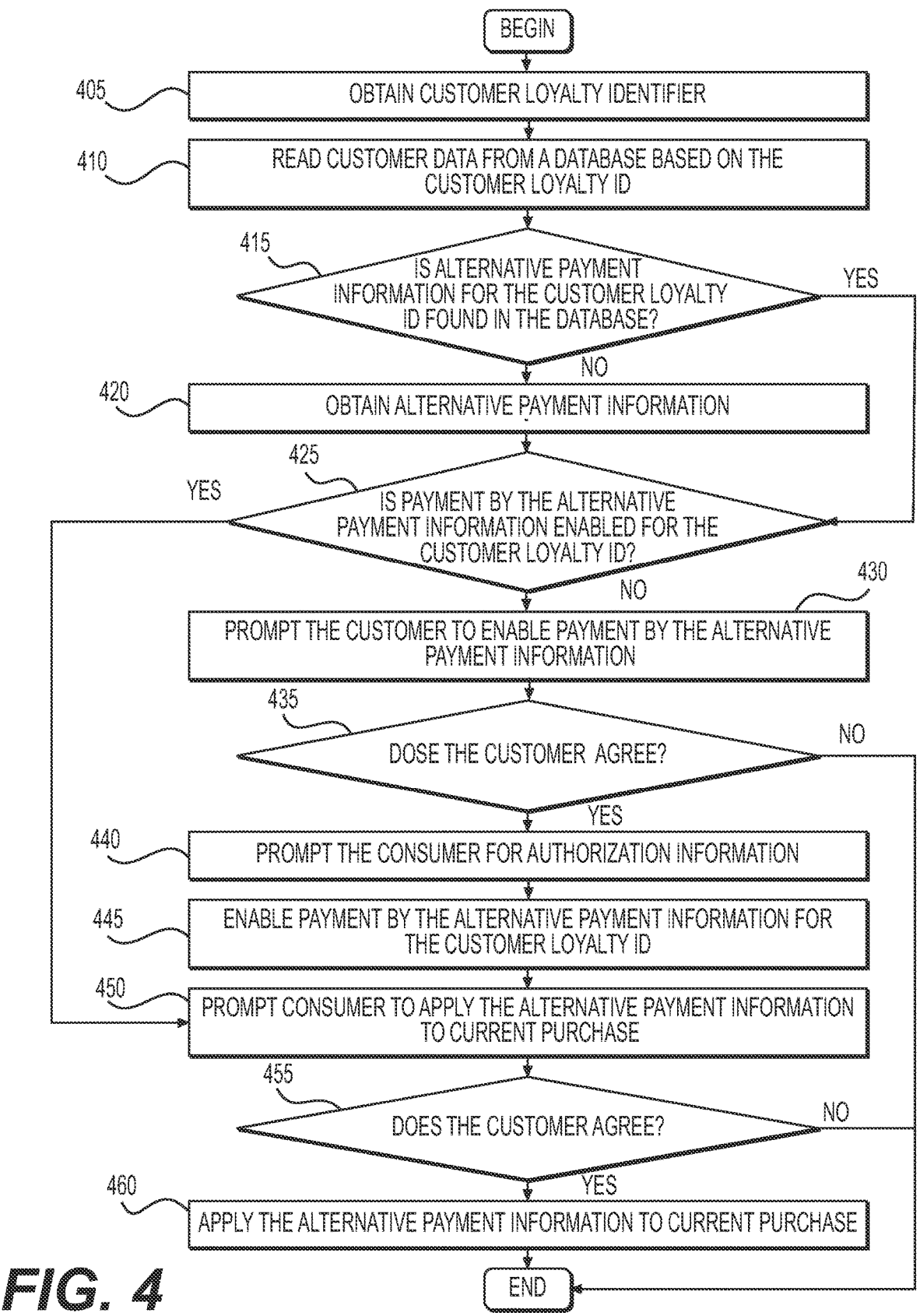
FIG. 4 is a flow chart depicting an example process for linking automated clearing house (ACH) data with merchant loyalty data.

With an association between customer loyalty identifier 310 and ACH data 320, merchant 210 may offer customer 102 a choice to complete a payment transaction using ACH data instead of payment vehicle 201. FIG. 4 is a flow chart depicting an example process for linking automated clearing house (ACH) data with merchant loyalty data. As shown in FIG. 4, in operation 405, a merchant may obtain a customer loyalty identifier pertaining to a customer. For example, merchant 210 depicted in FIG. 2 may obtain customer loyalty identifier 310 from customer 102 by way of, for example, a terminal, such as pin pad terminal 112, in communication with point-of-sale (POS) system 110 of merchant 210. The customer loyalty identifier may be obtained when the customer completes a transaction at the merchant's POS terminal, as shown in FIG. 1. For example, the customer may present a customer loyalty card, such as customer loyalty card 101 shown in FIG. 1. The customer loyalty card identifier may be encoded in a magnetic stripe or chip of the customer loyalty card and may be read by card reader 103 of pin pad terminal 112. Alternatively, customer 102 may display a code, such as, for example, a barcode or quick response (QR) code, etc., on the display of their mobile computing device to provide the customer loyalty identifier. Alternatively, the customer loyalty identifier may be communicated to the merchant by transmitting a signal, such as by using a near field communication (NFC) technology, or other secure transport technologies. In operation 410, the merchant may read customer data from a database based on customer loyalty identifier 310. For example, merchant 210 may read data from payment transaction database 300 as shown in FIG. 3. In operation 415, the merchant may determine whether ACH data corresponding to the customer loyalty ID is found in the database. If ACH data corresponding to the customer loyalty ID is not found in the database then in operation 420, the merchant may obtain ACH data corresponding to the customer loyalty ID, for example, by prompting the customer to enter or provide the ACH data. If ACH data corresponding to the customer loyalty ID is found in the database then in operation 425, the merchant may determine whether payment by the ACH data is enabled for the customer loyalty identifier.

If payment by the ACH data is not enabled for the customer loyalty identifier then in operation 430, the merchant may prompt the customer to enable payment by the ACH data. For example, merchant 210 may display a prompt on display area 122 of pin pad terminal 112. The displayed prompt may include an incentive for the customer to agree to authorize payment by the ACH data such as, for example, a discount on the current purchase, coupons to be applied to future purchases, a cash gift, or other gifts such as merchandise, etc. In operation 435, if the customer does not agree, then the method ends and the payment transaction is processed using the customer's preferred method of payment. Alternatively, the customer may be provided the opportunity to cancel the transaction, to present an alternative customer loyalty identifier, enter or select additional alternative payment information, etc. Otherwise, in operation 440, the merchant may prompt the customer for authorization information. The authorization information may be a numeric or alphanumeric authorization code, such as a personal identification number (PIN), entered on the keypad 216 of the merchant's POS system or through the display area 122 of the pin pad terminal 112. Alternatively, the authorization information may be biometric information of the customer provided through appropriate biometric readers connected to the merchant's POS system (not shown).

If authorization information is received in operation 440, then, in operation 445, the merchant may enable payment by the ACH data for purchases associated with the customer's customer loyalty ID, and in operation 450, the merchant may prompt the customer to apply the ACH data to the current purchase. For example, merchant 210 may display a prompt on display area 122 of pin pad terminal 112. The displayed prompt may include an incentive for the customer to agree to apply the ACH data to the current purchase such as, for example, a discount on the current purchase, coupons to be applied to future purchases, a cash gift, or other gifts such as merchandise, etc. In operation 455, if the customer does not agree then the method ends and the payment transaction is processed using the customer's preferred method of payment. Alternatively, the customer may be provided the opportunity to cancel the transaction, to present an alternative customer loyalty identifier, enter or select additional alternative payment information, etc. Otherwise, in operation 460, the merchant may apply the ACH data to the current purchase.

By these methods, a merchant may realize reduced processing costs for customer payment transactions. For example, a merchant accepting payment via a payment card such as, for example, Visa, MasterCard, Discover, or American Express, etc., may be charged processing fees assessed as a percentage of the transaction plus a fixed amount per transaction. Such fees may be, for example 1.5% plus $0.10 per transaction. A merchant processing 10,000 transactions totaling $500,000 would incur costs of $8,500. In a retail setting with low profit margins, such fees may represent a significant percentage cost to the merchant. Shifting customer payments to alternative forms of payment that do not incur such fees, such as ACH data, may, thus, provide additional profit for the merchant and may be sufficient to allow the merchant to offer cash or discount incentives to the customer.

These and other embodiments of the systems and methods may be used as would be recognized by those skilled in the art. The above descriptions of various systems and methods are intended to illustrate specific examples and describe certain ways of making and using the systems disclosed and described here. These descriptions are neither intended to be nor should be taken as an exhaustive list of the possible ways in which these systems can be made and used. A number of modifications, including substitutions of systems between or among examples and variations among combinations can be made. Those modifications and variations should be apparent to those of ordinary skill in this area after having read this disclosure.

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems such as client-server distributed systems, and can use other protocols, or operate at other layers in communication protocol stacks, than are described.

It is intended that the specification and examples be considered as exemplary only, with a true scope and spirit of the invention being indicated by the following claims.

What is claimed is:

1. A method for linking payment information with customer loyalty data, the method comprising:
   identifying, based on a received customer loyalty identifier, financial account information of a customer stored in a database of a point of sale (POS) system, the financial account information providing a payment vehicle associated with the customer;
   determining whether the payment vehicle reduces one or more fees to a merchant in exchange for completing a purchase transaction;
   upon determining that the payment vehicle reduces one or more fees to the merchant, determining whether the stored financial account information of the customer is enabled for the customer to apply to the purchase transaction;
   sending, based upon determining that a payment feature of the stored financial account information is not enabled for the customer loyalty identifier, first display instructions to the POS system for prompting the customer to enable the payment feature of the stored financial account information using the payment vehicle and to complete the purchase transaction using the payment vehicle; and applying the stored financial account information to the purchase transaction.

2. The method of claim 1, the method further comprising:
sending second display instructions to the POS system for prompting the customer for authorization information associated with payment by the stored financial account information using the payment vehicle; and
enabling the payment feature of the stored financial account information.

3. The method of claim 1, wherein prompts presented to the customer are presented using a display device of a point of sale system maintained by a merchant.

4. The method of claim 1, wherein prompting the customer to enable payment by the information of the financial account associated with the customer comprises offering an incentive for the customer to enable payment by the information of the financial account associated with the customer, the incentive being one or more of a discount on the purchase transaction, coupons to be applied to future purchases, a monetary gift, or a non-monetary gift.

5. The method of claim 2, wherein the authorization information comprises one or more of a numeric or alphanumeric authorization code or biometric information of the customer.

6. The method of claim 1, the method further comprising:
prompting the customer to apply the information of the financial account associated with the customer to the purchase transaction, the prompt comprising an offer of an incentive for the customer to apply the information of the financial account associated with the customer to the purchase transaction; and
applying the information of the financial account associated with the customer to the purchase transaction.

7. The method of claim 1, wherein the financial account information of the customer is automated clearing house (ACH) data associated with the customer.

8. A computer system for linking payment information with customer loyalty data, the system comprising:
a memory having processor-readable instructions stored therein; and
a processor configured to access the memory and execute the processor-readable instructions, which when executed by the processor configures the processor to perform a plurality of functions, including functions to:
identify, based on a received customer loyalty identifier, financial account information of a customer stored in a database of a point of sale (POS) system, the financial account information providing a payment vehicle associated with the customer;
determine whether the payment vehicle reduces one or more fees to a merchant in exchange for completing a purchase transaction;
upon determining that the payment vehicle reduces one or more fees to the merchant, determining whether the stored financial account information of the customer is enabled for the customer to apply to the purchase transaction;
send, based upon determining that a payment feature of the stored financial account information is not enabled for the customer loyalty identifier, first display instructions to the POS system for prompting the customer to enable the payment feature of the stored financial account information using the payment vehicle and to complete the purchase transaction using the payment vehicle; and
apply the stored financial account information to the purchase transaction.

9. The system of claim 8, wherein the instructions executed by the processor further cause the processor to:
send second display instructions to the POS system for prompting the customer for authorization information associated with payment by the stored financial account information using the payment vehicle; and
enable the payment feature of the stored financial account information.

10. The system of claim 8, wherein prompts presented to the customer are presented using a display device of a point of sale system maintained by a merchant.

11. The system of claim 8, wherein prompting the customer to enable payment by the information of the financial account associated with the customer comprises offering an incentive for the customer to enable payment by the information of the financial account associated with the customer, the incentive being one or more of a discount on the purchase transaction, coupons to be applied to future purchases, a monetary gift, or a non-monetary gift.

12. The system of claim 9, wherein the authorization information comprises one or more of a numeric or alphanumeric authorization code or biometric information of the customer.

13. The system of claim 8, wherein the instructions executed by the processor further cause the processor to:
prompt the customer to apply the information of the financial account associated with the customer to the purchase transaction, the prompt comprising an offer of an incentive for the customer to apply the information of the financial account associated with the customer to the purchase transaction; and
apply the information of the financial account associated with the customer to the purchase transaction.

14. The system of claim 8, wherein the financial account information of the customer is automated clearing house (ACH) data associated with the customer.

15. A non-transitory computer readable medium storing a program causing a computer to execute a method of linking payment information with customer loyalty data, the method comprising:
identifying, based on a received customer loyalty identifier, financial account information of a customer stored in a database of a point of sale (POS) system;
determining whether the financial account information of the customer reduces one or more fees to a merchant in exchange for completing a purchase transaction;
upon determining that the financial account information of the customer reduces one or more fees to a merchant, determining whether the stored financial account information of the customer is enabled for the customer to apply to the purchase transaction;
sending, based upon determining that a payment feature of the stored financial account information is not enabled for the customer loyalty identifier, first display instructions to the POS system for prompting the customer to enable the payment feature of the stored financial account information and to complete the purchase transaction using the stored financial account information; and
applying the stored financial account information to the purchase transaction.

16. The non-transitory computer readable medium of claim 15, the method further comprising:
sending second display instructions to the POS system for prompting the customer for authorization information associated with payment by the stored financial account information; and enabling the payment feature of the stored financial account information.

17. The non-transitory computer readable medium of claim 15, wherein prompts presented to the customer are presented using a display device of a point of sale system maintained by a merchant.

18. The non-transitory computer readable medium of claim 15, wherein prompting the customer to enable payment by the information of the financial account associated with the customer comprises offering an incentive for the customer to enable payment by the information of the financial account associated with the customer, the incentive being one or more of a discount on the purchase transaction, coupons to be applied to future purchases, a monetary gift, or a non-monetary gift.

19. The non-transitory computer readable medium of claim 15, the method further comprising:
   prompting the customer to apply the information of the financial account associated with the customer to the purchase transaction, the prompt comprising an offer of an incentive for the customer to apply the information of the financial account associated with the customer to the purchase transaction; and
   applying the information of the financial account associated with the customer to the purchase transaction.

20. The non-transitory computer readable medium of claim 15, wherein the financial account information of the customer is automated clearing house (ACH) data associated with the customer.

* * * * *